(12) United States Patent
Sipko et al.

(10) Patent No.: US 10,317,505 B1
(45) Date of Patent: Jun. 11, 2019

(54) COMPOSITE SOUND OUTPUT FOR NETWORK CONNECTED DEVICES

(71) Applicant: Microsoft Technology Licensing, LLC, Redmond, WA (US)

(72) Inventors: Jeffrey Sipko, Kirkland, WA (US); Adolfo Hernandez Santisteban, Bothell, WA (US); Priya Ganadas, Seattle, WA (US); Ishac Bertran, Seattle, WA (US); Andrew Frederick Muehlhausen, Seattle, WA (US); Aaron Daniel Krauss, Snoqualmie, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/940,855

(22) Filed: Mar. 29, 2018

(51) Int. Cl.
  *G01S 3/808* (2006.01)
  *G06F 3/16* (2006.01)
  (Continued)

(52) U.S. Cl.
  CPC ............ *G01S 3/8083* (2013.01); *G06F 3/165* (2013.01); *H04L 67/306* (2013.01); *H04W 8/005* (2013.01)

(58) Field of Classification Search
  CPC ......... G01S 3/8083; G01S 3/165; G10H 1/00; H04L 67/306; H04W 8/005; H04R 29/008
  (Continued)

(56) References Cited

U.S. PATENT DOCUMENTS

| 9,031,243 | B2 | 5/2015 | LeBoeuf et al. |
| 9,736,580 | B2 | 8/2017 | Cahill et al. |

(Continued)

FOREIGN PATENT DOCUMENTS

| WO | 2017119915 A1 | 7/2017 |
| WO | 2018005316 A1 | 1/2018 |

OTHER PUBLICATIONS

"Spatial Sound Design", Retrieved from <<https://web.archive.org/web/20171222220105/https://developer.microsoft.com/en-us/windows/mixed-reality/spatial_sound_design>>, Dec. 22, 2017, 5 Pages.

(Continued)

*Primary Examiner* — Kamran Afshar
*Assistant Examiner* — Farid Seyedvosoghi
(74) *Attorney, Agent, or Firm* — Alleman Hall Creasman & Tuttle LLP

(57) ABSTRACT

A computer system is provided that includes one or more processors configured to receive a stream of data from a plurality of network connected devices configured to measure physical parameters, and store a user profile including user settings for a plurality of notification subscriptions associated with physical parameters measured by the plurality of network connected devices. Each notification subscription includes programming logic for a trigger condition for a candidate notification based on measured physical parameters and an associated component sound for the candidate notification. The one or more processors are further configured to determine that trigger conditions for a plurality of candidate notifications are met based on the received stream of data, and generate a composite sound output including a plurality of component sounds associated with the plurality of notifications rendered.

20 Claims, 8 Drawing Sheets

(51) Int. Cl.
*H04W 8/00* (2009.01)
*H04L 29/08* (2006.01)
(58) Field of Classification Search
USPC ...................................... 455/414.2
See application file for complete search history.

(56) References Cited

U.S. PATENT DOCUMENTS

| | | | |
|---|---|---|---|
| 2015/0163412 A1* | 6/2015 | Holley | G05B 15/02 348/143 |
| 2016/0198296 A1* | 7/2016 | Jung | H04W 4/021 455/456.3 |
| 2017/0055100 A1 | 2/2017 | Wong | |

OTHER PUBLICATIONS

Hong, et al., "Spatial Audio for Soundscape Design: Recording and Reproduction", In Journal of Applied Sciences, vol. 7, Issue 6, Jun. 16, 2017, 22 Pages.

Ribeiro, et al., "Auditory Augmented Reality: Object Sonification for the Visually Impaired", In Proceedings of the IEEE 14th International Workshop on Multimedia Signal Processing, Sep. 17, 2012, pp. 319-324.

\* cited by examiner

COMPOSITE SOUND OUTPUT FOR NETWORK CONNECTED DEVICES

BACKGROUND

Many modern computer programs utilize sound notifications to alert a user to a changed status, such as an error message, a communication receipt message, etc. A user may receive such sound notifications from disparate programs operating on disparate devices in the same physical environment. This may result in sensory overload for the user, such that the user is unable to efficiently discern amongst the various sound notifications.

SUMMARY

To address this issue, a computer system is provided that includes one or more processors configured to receive a stream of data from a plurality of network connected devices configured to measure physical parameters, each network connected device having an associated location. The one or more processors are further configured to store a user profile for a user, the user profile including user settings for a plurality of notification subscriptions associated with physical parameters measured by the plurality of network connected devices, each notification subscription including programming logic for a trigger condition for a candidate notification based on measured physical parameters and an associated component sound for the candidate notification. The one or more processor are further configured to determine that trigger conditions for a plurality of candidate notifications are met based on the received stream of data, determine audio rendering characteristics for the plurality of candidate notifications based on a detected location of the user relative to the associated locations of the plurality of network connected devices, generate a composite sound output including a plurality of component sounds associated with the plurality of notifications rendered based on the determined audio rendering characteristics, and send the composite sound output to be played to the user via a speaker system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
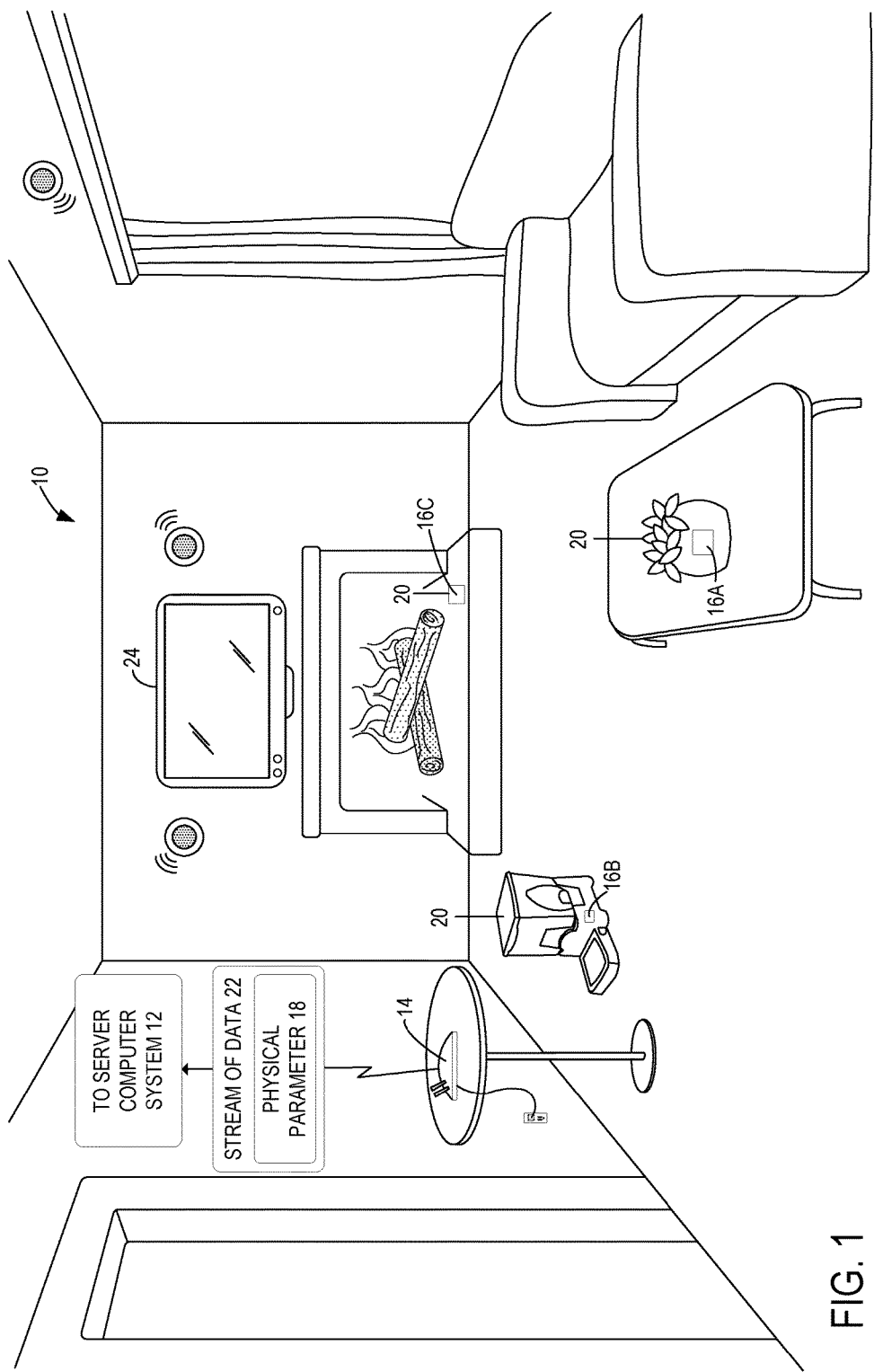
FIG. 1 shows an example client computer system for gathering data from a plurality of network connected devices.

To address these issues, a client computer system 10 and a server system 12 are provided. FIG. 1 illustrates a client computer system 10 that is distributed around an example physical environment, namely, a house of a user. The client computer system 10 is configured to communicate with a server computer system 12 via a network, such as, for example, a wireless network mediated by a wireless network device 14. The client computer system 10 includes a plurality of network connected devices 16 configured to measure physical parameters 18. In the illustrated example, the plurality of network connected devices 16 include a plant health sensor 16A configured to measure several different physical parameters 18, such as, for example, a plant moisture level, a soil nutrient value, etc. As another example, the plurality of network connected devices 16 includes a pet feeder sensor 16B configured to measure a physical parameter 18 of a food level of the pet feeder. As yet another example, the plurality of network connected devices 16 includes a fireplace sensor 16C configured to measure a physical parameter 18 of a fire state of the fireplace. In one example, one or more of the plurality of network connected devices 16 may not include a display device. Such non-display enabled network connected devices 16 may include a sensor configured to measure a physical parameter of a real-world object or environment and send the measured data to a computer device, for example, via a wired or wireless connection.

It will be appreciated that the types of network connected devices 16 discussed above are merely exemplary, and that other types of network connected devices 16 configured to measure other types of physical parameters 18 may also be included in the client computer system 10. For example, the network connected devices 16 may include a door lock sensor device configured to measure a physical parameter 18 of whether or not a door is closed and locked. As another example, the network connected devices 16 may include a weather sensor device configured to measure a physicals parameter 18 of a local weather condition, such as temperature, wind speed, barometric pressure, precipitation, ultraviolet radiation, humidity, etc.

As illustrated in FIG. 1, each network connected device 16 has an associated location 20, which, for example, may be a latitude and longitude or Global Positioning System (GPS) location. In another example, the associated location 20 may be defined by its general location, such as in the living room, on the patio, in the backyard, in the office, etc. However, it will be appreciated that other technologies and methods may be used to define the associated location 20 for each network connected device 16, such as, for example, defining the associated location 20 by a plurality of nearby wireless signals.

In one example, each network connected device 16 may include a processor or another type of hardware-logic component such as, for example, field-programmable gate arrays (FPGAs), program- and application-specific integrated circuits (PASIC/ASICs), program- and application-specific standard products (PSSP/ASSPs), system-on-a-chip (SOC), complex programmable logic devices (CPLDs), etc. The processor of each network connected device 16 may be configured to detect and measure a physical parameter 18 via an appropriate sensor device of the network connected device 16. The measured values for the physical parameter 18 may be packaged and sent from the network connected device 16 to the server computer system 12 via the wireless network device 14 in a stream of data 22.

In another example, the processor of the network connected device 16 may be configured to send measured values for the physical parameter 18 to a client computer device 24 of the client computer system 10. In the example illustrated in FIG. 1, the client computer device 24 takes the form of a large format display, and may include its own processor, non-volatile storage, volatile storage, and other suitable computer components. However, it will be appreciated that the client computer device 24 may take other suitable forms, such as, for example, a desktop computer device, a laptop computer device, smartphone, tablet computer device, etc.

The client computer device 24 of the client computer system 10 may be configured to gather the measured values of physical parameters 18 from each network connected device of the plurality of network connected devices 16 and send the gathered data to the server computer system 12 in the stream of data 22. In one example, the client computer device 24 may send the stream of data 22 including the measured values of the physical parameters 18 via the wireless network device 14. However, it will be appreciated that the client computer device 24 may send the stream of data 22 to the server computer system 12 via a wired connection, or other type of communication medium.

Figure 2:
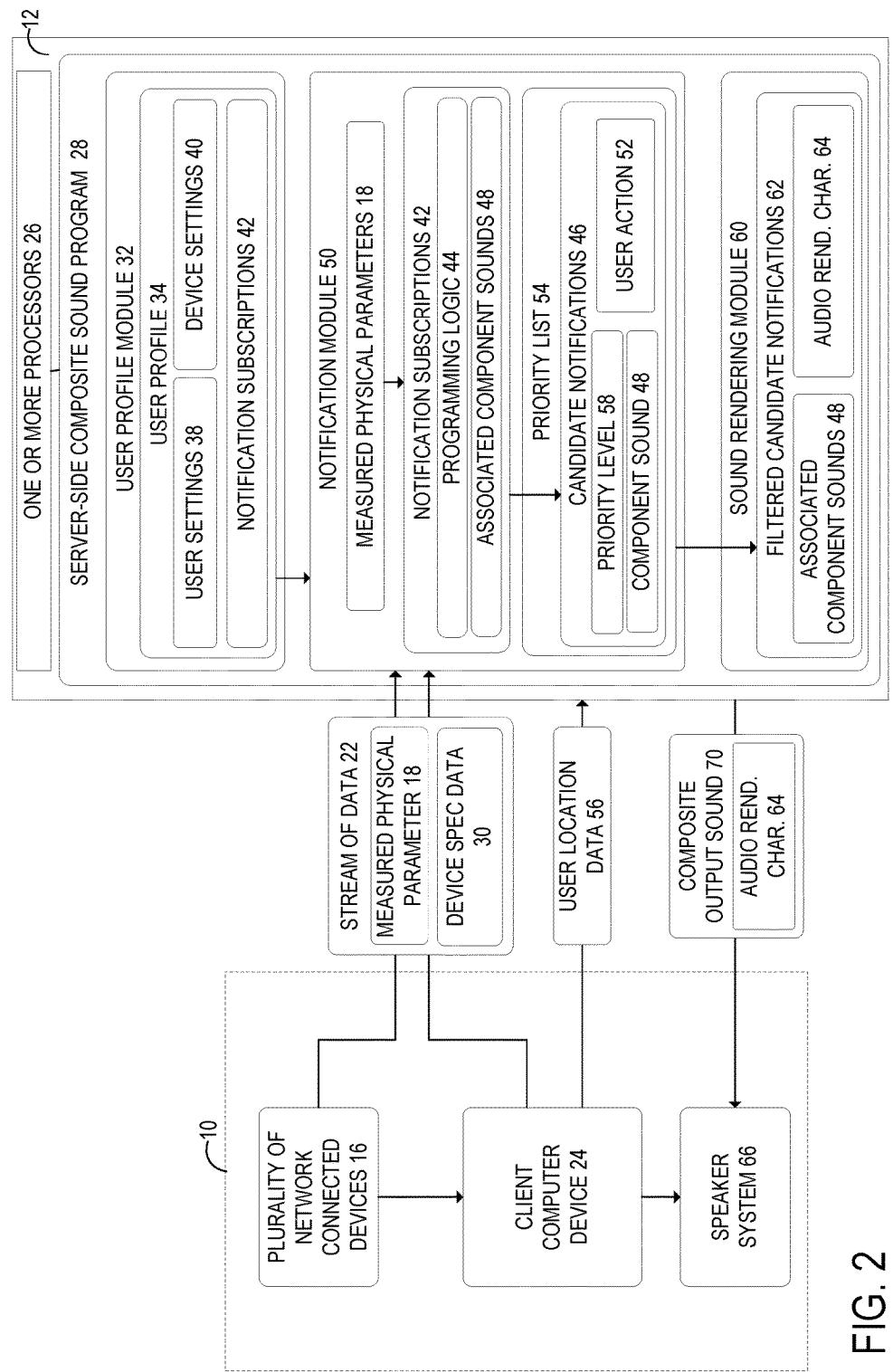
FIG. 2 shows a schematic view of a server computer system in communication with the client computer system of FIG. 1.

FIG. 2 illustrates an example server computer system 12 that includes one or more processors 26 configured to execute a server-side composite sound program 28. As illustrated, the server-side composite sound program 28 executed by the one or more processors 26 of the server computer system 12 is configured to receive the stream of data 22 from the plurality of network connected devices 16 configured to measure physical parameters 18. In one example, the plurality of network connected devices 16 may be configured to send the stream of data 22 themselves over a network, such as, for example, a wide area network (WAN). In another example, the plurality of network connected devices 16 may be configured to send the stream of data 22 to the client computer device 24 of the client computer system 10, which in turn may be configured to send the stream of data 22 to the server-side composite sound program 28.

As illustrated, the stream of data 22 includes measured values of the physical parameters 18 being measured by the plurality of network connected devices 16. In one example, the measured values of the physical parameters 18 may include raw data gathered by the sensor. In another example, the physical parameter 18 sent in the stream of data 22 may instead be a Boolean value, which, for example, may represent whether the pet feeder illustrated in FIG. 1 has enough pet food or not enough pet food. However, it will be appreciated that other types of values for the physical parameter 18 may be sent to the server-side composite sound program 28.

In one example, the stream of data 22 may further include device specification data 30 for each of the plurality of network connected devices 16. The device specification data 30 may include data regarding device capabilities, device requirements, device APIs, another other suitable device specification data 30. The device specification data 30 may also include the associated location 20 for each of the plurality of network connected devices 16. In this manner, the server-side composite sound program 28 may be made aware of each network connected device 16 being employed by the user, the capabilities of those network connected devices 16, and the locations of those network connected devices 16.

In another example, the server-side composite sound program 28 may include a user program module 32 configured to store a user profile 34 for the user 36. In one example, the user 36 may access their user profile 34 via a web portal using the client computer device 24 to adjust user settings, as well as sync the plurality of network connected devices 16 to their user profile 34 to control the data being uploaded from the client computer system 10 to the server computer system 12. For example, the user may adjust user settings 38 for each network connected device 16 to select whether measured values for the physical parameter 18 for that network connected device 16 should be uploaded to the server computer system 12, and to adjust a granularity of the measured values for the physical parameter 18, and set other device settings 40. The user may also adjust the device settings 40 to specify an associated location for each of the plurality of network connected devices 16, such as, for example, at the office, at home, in the living room, in the backyard, etc. Machine learning techniques may be used by the computer system to impute the location of the plurality of network connected devices, as well. However, it will be appreciated that the user 36 may access their user profile via other methods than a web portal. For example, the client computer device 24 may take the form of a mobile computer device that includes an application associated with server-side composite sound program 28. In this example, the user may enter input into an interface of the application to adjust their user settings 38 as described herein. It will be appreciated that any other suitable input method and medium may be used to adjust the user settings 38.

The user may also adjust user settings 38 for a plurality of notification subscriptions 42 via the user profile module 32. For example, the user may select the notification subscriptions 42 from among a plurality of notification subscriptions offered by the server-side composite sound program 28. In one example, the server-side composite sound program 28 may perform initial processing on the stream of data 22 to determine what types of network connected devices 16 the user is employing based on the device specification data 30, and what types of physical parameters 18 the user's network connected devices 16 are able to measure. The server-side composite sound program 28 may suggest one or more notification subscriptions 42 that are associated with physical parameters 18 measured by the plurality of network connected devices 16. The suggested one or more notification subscriptions 42 may be presented to the user, and the user may select and subscribe to one or more of the suggested notification subscriptions. In another example, the user may search through the notification subscriptions 42 offered by the server-side composite sound program 28 and select and subscribe to one or more of those notification subscriptions 42. The user may also adjust various user settings 38 for each of the selected notification subscriptions 42.

As illustrated in FIG. 2, each notification subscription 42 includes programming logic 44 for a trigger condition for a candidate notification 46 based on measured physical parameters 18 and an associated component sound 48 for the candidate notification. The server-side composite sound program 28 executed by the one or more processors 26 of the server computer system 12 includes a notification module 50 configured to apply the programming logic 44 of each of the user selected notification subscriptions 42 to the stream of data 22 uploaded by the user's client computer system 10. In one example, the notification subscription 42 may process the measured physical parameters 18 to determine that trigger conditions for a plurality of candidate notifications 46 are met based on the received stream of data 22.

Figure 3:
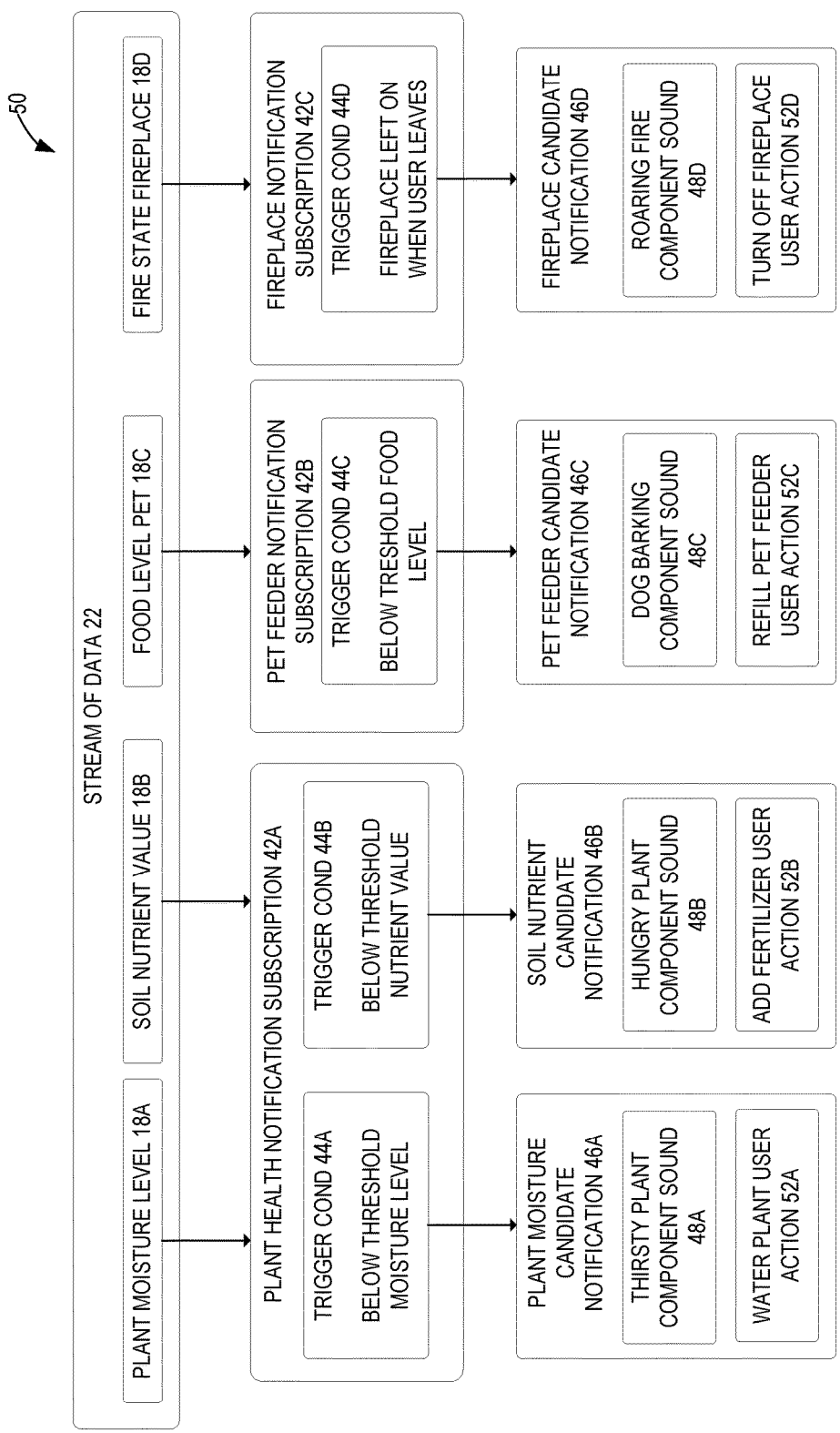
FIG. 3 shows example notification subscriptions that process the data gathered from the plurality of network connected devices of FIG. 1.

FIG. 3 illustrates an example notification module 50 processing a stream of data 22 via user selected notification subscriptions 42 including a plant health notification subscription 42A, a pet feed notification subscription 42B, and a fireplace notification subscription 42C. Each of these user selected notification subscriptions 42A, 42B, and 42C, includes programming logic 44 for a trigger condition. In this example, the plant health notification subscription 42A includes both programming logic for a moisture level trigger condition 44A and programming logic for a soil nutrient trigger condition 44B. Upon receiving the stream of data 22, the example notification module 50 is configured to determine what types of physical parameters 18 are included in the stream of data 22. In the illustrated example, the stream of data 22 includes measured values for a plant moisture level physical parameter 18A and measured values for a soil nutrient value physical parameter 18B. Next, the example notification module 50 determines that these two physical parameters 18 are associated with the plant health notification subscription 42A selected by the user. Accordingly, the example notification module 50 processes the measured values for the plant moisture level physical parameter 18A and measured values for the soil nutrient value physical parameter 18B according to the programming logic of the plant health notification subscription 42A.

In this specific example, the programming logic for the moisture level trigger condition 44A specifies a threshold moisture level that will cause the plant health notification subscription 42A to trigger or not trigger a plant moisture candidate notification 46A. Thus, if the measured values for the plant moisture level physical parameter 18A are below the threshold moisture level of the trigger condition, then the example notification module 50 determines that the trigger condition for the plant health notification subscription 42A has been met, and generates the plant moisture candidate notification 46A according to user settings 38 for the plant health notification subscription 42A. For example, the user may specify in the user settings 38, what type of component sound 48 should be associated with plant moisture notifications. In the illustrated example, when generating the plant moisture candidate notification 46A, the example notification module 50 associated a thirsty plant component sounds 48A with the plant moisture candidate notification 46A.

As another example, the programming logic for a soil nutrient trigger condition 44B specifies a threshold nutrient level to trigger or not trigger a soil nutrient candidate notification 46B. Similarly, if the measured values for the soil nutrient physical parameter 18B in the stream of data 22 is below the specified threshold nutrient value, then the example notification module 50 determines that the trigger condition for the plant health notification subscription 42A has been met, and generates the soil nutrient candidate notification 46B. The generated soil nutrient candidate notification 46B may also have its own associated component sound 48B that may be specified by the user in the user settings or may be a default sound component. In the illustrated example, the associated component sound 48 is a hungry plant component sound 48B.

In one example, the notification module 50 may also associate a specific user action 52 with the candidate notification 46 that the user may perform to resolve the candidate notification. For example, if the notification module 50 has triggered the generation of a plant moisture candidate notification 46A, the notification module 50 may associate a water plant user action 52A with the plant moisture candidate notification 46A. Thus, to resolve the plant moisture candidate notification 46A, the user may water the plant being measured. In this example, the associated component sound 48 for each candidate notification 46 may be configured to indicate the user action 52 associated with that candidate notification 46 to the user. For example, the associated component sound 48 may be selected to convey what kind of action the user should take to resolve the notification. In this specific example, the thirsty plant candidate notification 46A may be selected to convey to the user that the user should water the plant.

As another example, the notification module 50 may associated an add fertilizer user action 52A to the generated soil nutrient candidate notification 46B, and the hungry plant component sound 48B may be designed to convey to the user that their plant requires additional fertilizer.

As another example illustrated in FIG. 3, the example notification module 50 may process the stream of data 22 with the programming logic 44 of the pet feeder notification subscription 42B selected by the user. In this example, the programming logic for a pet feeder trigger condition 44C specifies a threshold pet feeder food level to trigger or not trigger a pet feeder candidate notification 46C. If the measured values for the pet feeder food level physical parameter 18C in the stream of data 22 is below the specified threshold pet feeder food level, then the example notification module 50 determines that the trigger condition for pet feeder notification subscription 42B has been met, and generates the pet feeder candidate notification 46C. The pet feeder candidate notification 46C includes its own associated component sound 48 that may be specified by the user in the user settings or may be a default sound component. In the illustrated example, the associated component sound 48 is a dog barking component sound 48C. That pet feeder candidate notification 46C may also be generated to include a refill pet feeder user action 52C, and the dog barking component sound 48C may be designed to convey to the user to perform the refill pet feeder user action 52C.

As yet another example, the example notification module 50 may process the stream of data 22 with the programming logic 44 of the fireplace notification subscription 42C selected by the user. In this example, the programming logic for a fireplace trigger condition 44C specifies a Boolean condition for whether the fireplace is turned on or not when the user is leaving to trigger a fireplace candidate notification 46D. Thus, if the fire state of the fireplace physical parameter 18D indicates a value of "TRUE" when the user is detected to be leaving the house, then the example notification module 50 determines that the trigger condition for the fireplace notification subscription 42C has been met, and generates fireplace candidate notification 46D. The fireplace candidate notification 46D includes its own associated component sound 48 that may be specified by the user in the user settings or may be a default sound component. In the illustrated example, the associated component sound 48 is a roaring fire component sound 48D. That fireplace candidate notification 46D may also be generated to include a turn off fireplace user action 52D, and the roaring fire component sound 48D may be designed to convey to the user to perform the turn off fireplace user action 52D.

It will be appreciated that the specific notification subscriptions, candidate notifications, component sounds, and user actions described above are merely exemplary, and that other types and categories of notification subscriptions may be utilized to generate other types of candidate notifications and associated component sounds and user actions. For example, a door lock notification subscription may be utilized to determine whether the user locked their door as they left their home, and trigger an unlocked door candidate notification if the stream of data 22 indicates that the door is unlocked.

Turning back to FIG. 2, the notification module 50 is configured to continually monitor and process the stream of data 22 being sent by the client computer system 10, and generate a plurality of candidate notifications 46 based on measured physical parameters 18 in the stream of data 22 processed according the programming logic 44 of each notification subscription 42 selected by the user. In this manner, candidate notifications 46 may be continually generated as trigger conditions for a plurality of notification subscriptions 42 are met. In one example, these candidate notifications 46 may be added to a priority list 54 as they are generated. The priority list 54 may be configured to maintain a list of all currently active candidate notifications 46 for the user, as well as a priority level 58 for each of those candidate notifications 46.

The notification module 50 may be configured to determine the priority list 54 for the plurality of candidate notifications 46 based on a suitable prioritization model. In one example, priority levels 58 of candidate notifications 46 in the priority list 54 are determined based a detected location of the user 36 relative to the associated locations 20 of the plurality of network connected devices 16. In one example, the client computer device 24 of the client computer system 10 may take the form of a wearable computer device, such as, for example, a wrist-mounted computer device or a head mounted computer device. In this example, the wearable computer device may include a position sensor configured to detect a position of the user as the user moves. For example, the wearable computer device may include a GPS sensor, an accelerometer, an inertial measurement unit, or other type of position sensor to track the user's location. The wearable computer device may be configured to send user location data 56 to the server computer system 12. The notification module 50 may be configured to compare the user location data 56 to the known associated locations 20 of the plurality of network connected devices 16, and determine how far the user is from each network connected device 16. In one example, the notification module 50 may be configured to assign candidate notifications 46 in the priority list that are associated with physical parameters 18 measured by network connected devices that are currently closer to the user with a higher priority level 58 than candidate notifications that are associated with physical parameters 18 measured by network connected devices that are currently farther away from the user.

As another example, the priority level 58 of each candidate notification 46 in the priority list 54 may be determined based on a current mode of the user. For example, if the user is currently located at work and/or is otherwise in a work mode, the notification module 50 may be configured to assign candidate notifications 46 associated with network connected devices in the user's home with a lower priority than candidate notifications 46 associated with network connected devise at the user's work, and vice versa. Alternatively, the user may set the user settings 38 for each notification subscription 42 to assign a particular user mode to that notification subscription 42, such as, for example, a work mode vs a personal mode.

It will be appreciated that the methods of assigning priority levels 58 to the candidate notifications 46 in the priority list 54 described above are merely exemplary, and that other prioritization methods may be utilized by the notification module 50 to rank and prioritize the candidate notifications 46.

In one example, the server-side composite sound program 28 is configured to filter the plurality of candidate notifications 46 based on the determined priority list 54 by suppressing candidate notifications 46 below a threshold priority level in the priority list 54. The threshold priority level may be set to prevent to many sounds from being simultaneously played to the user. For example, the threshold priority level may be set such that a predetermined number (three, five, seven, etc.) of the top candidate notifications 46 are sent to the sound rendering module 60 for rendering into a composite output sound 62, while the other candidate notifications 46 are temporarily suppressed. As another example, the threshold priority level may be set such that only candidate notifications 46 with a high priority are sent to the sound rendering module 60, while all candidate notifications 46 with a low priority are temporarily suppressed. The threshold priority level may be set to a default value that is adjustable by the user via the user settings 38. However, it will be appreciated that the candidate notifications 46 may be prioritized and filtered via the priority list 54 according to any suitable method.

The filtered candidate notifications 62 are sent from the notification module 50 to the sound rendering module 60 of the server-side composite sound program 28. In one example, the sound rendering module 60 may be configured to determine audio rendering characteristics 64 for the filtered candidate notifications based on a detected location of the user 36 relative to the associated locations 20 of the plurality of network connected devices 16. In one example, the audio rendering characteristics 64 may determined to specify how each of the component sounds 48 associated with the filtered candidate notifications 62 will be played out of a speaker system 66 of the client computer system 10. For example, the audio rendering characteristics 64 may specify which speaker of a plurality of speakers of the speaker system 66 should play each component sound 48. In another example, the audio rendering characteristic for a particular component sound may be adjusted so as to avoid too much similarity between two or more component sounds that will be played back in the composite sound output. For example, the type, tone, pitch, frequency, rhythm, etc. may be adjusted to make a particular component sound aurally distinguishable from another in the same composite sound output.

Figure 4:
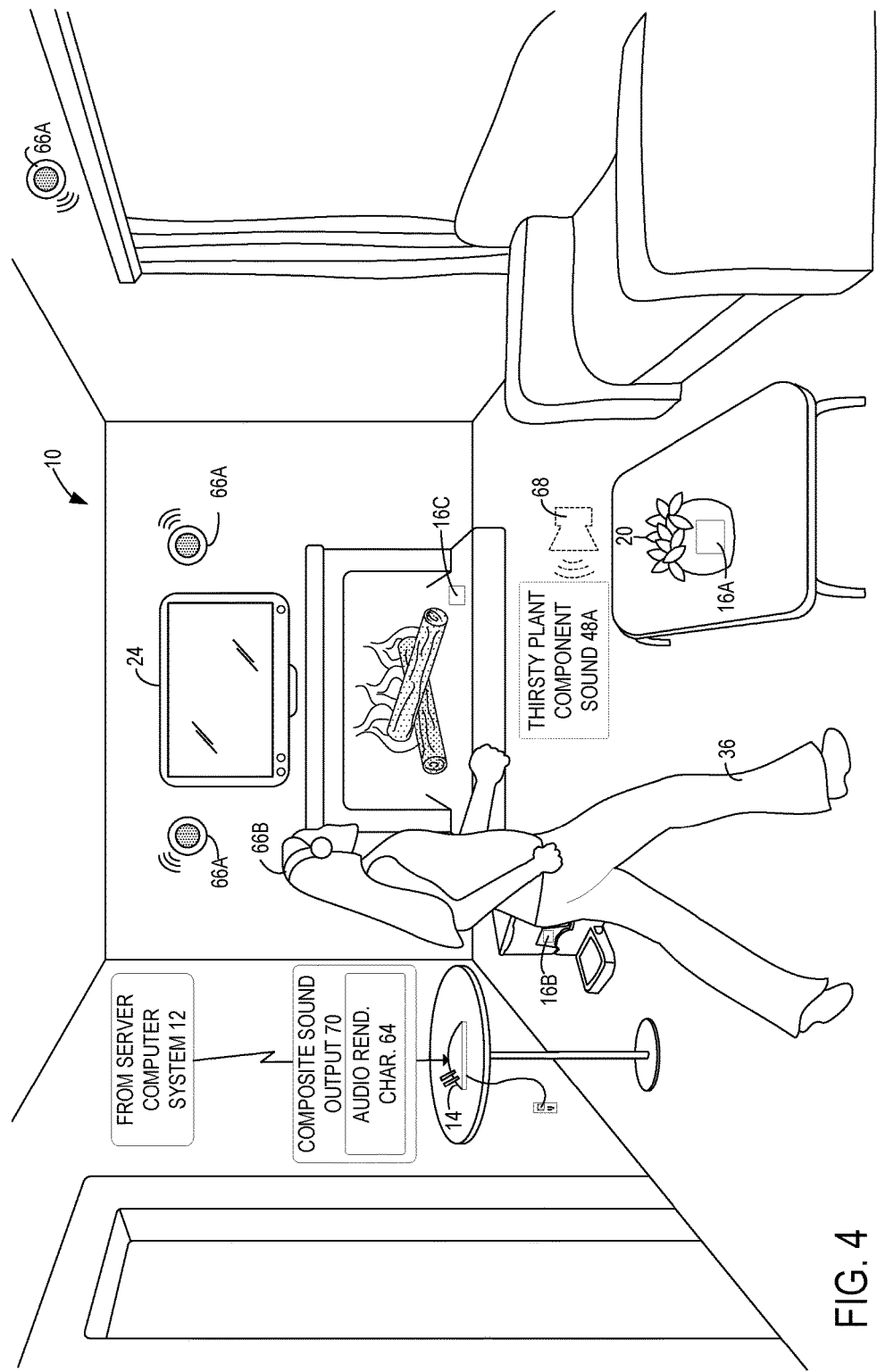
FIG. 4 shows an example composite sound output played by the speaker system of the client computer system of FIG. 1.

Turning briefly to FIG. 4, in one example, the speaker system 66 may include one or more speaker devices 66A located proximate to the plurality of network connected devices 16. In the illustrated example, three speaker devices 66A of the speaker system 66 of the client computer system 10 are located around the living room of the user's 36 house. The three speaker devices 66A are located nearby the plant health sensor 16A, the pet feeder sensor 16B, and the fireplace sensor 16C of the plurality of network connected devices 16. In this example, the determined audio rendering characteristics 64 include a device specific audio rendering characteristic configured to specify a speaker device from a plurality of speaker devices 66A of the speaker system 66 for each component sound 48. In one example, the sound rendering module 60 may determine the device specific audio rendering characteristics based on the device specification data 30 in the stream of data 22, which may include specification data for each speaker device 66A of the speaker system 66.

For example, determined audio rendering characteristics 64 may specify that the associated component sound 48 for the plant health sensor 16A is to be played from the speaker device that is closest to the associated location 20 for the plant health sensor 16A, and that a speaker device located in a different room, such as the kitchen, should not play the associated component sound 48. In this manner, the device specific audio rendering characteristic may be determined to localize each component sound to the area or location of the associated network connected device 16.

As another example, the sound rendering module 60 may be configured to compare the user's current location from the user location data 56 to the locations of each speaker device of the speaker system 66, and determine the device specific audio rendering characteristics to specify that a speaker device closest to the user's current location should play each of the component sounds 48.

Further in the example illustrated in FIG. 4, the speaker system 66 may include a near-ear speaker 66B worn by the user 36 and configured to output spatial audio. In one example, the near-ear speakers 66B may take the form of headphones worn by the user. As another example, the near-ear speakers 66B may take the form of earbuds or another type of hearable device that are communicatively coupled to a client computer device 24, which, for example, may take the form of a wrist-mounted or head-mounted computer device. The near-ear speakers 66B and/or the client computer device 24 may be configured to track a position and orientation of the user's head, and play spatial audio based on the tracked position and orientation of the user.

In this example, the determined audio rendering characteristics 64 may include a spatial audio rendering characteristic configured to localize each component sound 48 being played by the near-ear speaker 66B to the associated locations 20 of the plurality of network connected devices 16 relative to the detected location of the user 36. For example, the determined audio rendering characteristics 64 may specify a location of a virtual speaker where each component sound 48 will be localized, and the near-ear speaker 66B may be configured to play the spatial audio for that component sound 48 such that it is perceived by the user 36 as originating from the location of the virtual speaker. In the example illustrated in FIG. 4, the spatial audio rendering characteristic may specify a virtual location for a virtual speaker 68 that is located at or near the associated location 20 for the plant health sensor device 16A of the plurality of networked connected devices 16 for the thirsty plant component sound 48A associated with the plant moisture candidate notification 46A triggered in FIG. 3. Based on this spatial audio rendering characteristic, the near-ear speakers 66B may be configured to play the thirsty plant component sound 48A such that the user 36 perceives that component sound to be originating from the location of the virtual speaker 68, which, in this example, is located near the plant health sensor device 16A. In this manner, the user's 36 attention is directed toward the plant, and the thirsty plant component sound 48A notifies the user that the plant needs to be watered. In this manner, each component sound 48 of the filtered candidate notifications being rendered may be played by the near-ear speakers 66B as originating from each associated network connected device 16, using spatial audio techniques.

Turning back to FIG. 2, the sound rendering module 60 is further configured to generate a composite sound output 70 including the plurality of component sounds 48 associated with the plurality of candidate notifications rendered based on the determined audio rendering characteristics 64. In one example, the composite sound output 70 may render only the component sounds 48 associated with the filtered candidate notifications 62, and suppress component sounds 48 from the other candidate notifications 62 that were filtered out via the priority list 54. In another example, the composite sound output 70 may render each of the component sounds 48 associated with the plurality of candidate notifications 46. In this example, the sound rendering module 60 may be further configured to render the component sounds 48 such that component sound 48 associated with candidate notifications 46 having a lower priority level in the priority list 54 are deemphasized as compared to component sounds 48 associated with candidate notifications 46 having a higher priority.

In spatial audio examples, the sound rendering module 60 may be further configured to generate the composite sound output 70 to include spatial audio for the plurality of component sounds 48 based on the spatial audio rendering characteristics of the determined audio rendering characteristics 64. In device specific audio examples, the sound rendering module 60 may be further configured to generate the composite sound output 70 to attach device specific data to each of the component sounds 48 based on the device specific audio rendering characteristic of the determined audio rendering characteristics 64.

It will be appreciated that the sound rendering module 60 may be configured to perform other processes and methods for sound rendering not specifically mentioned above to generate the composite sound output 70.

After generating the composite sound output 70, the server computer device 12 may be configured to send the composite sound output 70 to be played to the user 36 via a speaker system 66. In one example, the server computer system 12 may be configured to send the composite sound output 70 directly to the speaker system 66 via the wireless device 14. As another example, the server computer system 12 may be configured to send the composite sound output 70 to the client computer device 24 of the client computer system 10, which in turn may be configured to send the composite sound output 70 to the speaker system 66. In this example, the client computer device 24 may be further configured to perform post processing on the composite sound output 70 to appropriately play the composite sound output 70 from the speaker system 66. For example, the client computer device 24 may be configured to process the audio rendering characteristics 64 of the composite output sound 70, and individually send each component sound to a suitable speaker device of the speaker system 66. It will be appreciated that the client computer device 24 may also perform other types of post-processing, such as, for example, local volume adjustment, local pitch changing, etc., on the composite output sound 70 before playing the composite output sound 70 from the speaker system 66.

As discussed previously, each candidate notification 46 may also include an associated user action 52 that will resolve that candidate notification 46. In one example, after sending the composite output sound 70, the one or more processor 26 executed the server-side composite sound program 28 may be configured to detect a user action that is associated with one of the plurality of candidate notifications 46. The user action may be detected based on a detected change in the stream of data 22. In one specific example, the plant moisture candidate notification 46A has an associated water plant user actions 52A that will resolve the notification. Thus, while the plant moisture candidate notification 46A is active, the notification module 50 may be configured to continually monitor the plant moisture level physical parameter 18A in the stream of data 22. If the plant moisture level physical parameter 18A increases and reaches a level that is above the threshold moisture level of the trigger condition 44A, then the notification module 50 may be configured to determine that the user has performed the associated water plant user action 52A, and may resolve the plant moisture candidate notification 46A.

However, it will be appreciated that the user action may be detected via other methods. For example, the user computer device 24 of the user computer system 10 may include a microphone that is configured to detect sounds near the plurality of network connected devices 16. The user computer device 24 and/or the server computer system 12 may be configured to perform sound analysis on the detected sounds, and detect recognizable sounds associated with the active candidate notifications 46. For example, the detected sounds may be analyzed to detect a water pouring sounds to determine whether the user is performing the water plant user actions 52A. In this example, the user may adjust privacy settings for the user settings 38 to specify whether sound data should be detects and/or uploaded to the server computer system 12.

After detecting that the user has performed the user action associated with an active candidate notification 46, the notification module 50 may be configured to resolve or otherwise modify the associated candidate notification 46. For example, after the user has performed the water plant user action 52A, the notification module 50 may be configured to deactivate/remove the plant moisture candidate notification 46A from the priority list. In other examples, the candidate notification may include a sequence of user actions to be performed, or may have varying degrees of severity such that a single user action does not completely resolve the candidate notification 46A. In these example, rather than deactivating/removing the associated candidate notification 46A, the notification module 50 may be configured to modify the associated candidate notification 46A to indicate that one of a plurality of user actions have been completed.

After deactivating/removing or otherwise modifying the active candidate notifications 46 in the priority list 54, the notification module 50 is configured to send an updated list of filtered candidate notifications 62 to the sound rendering module 60, which, in this example, is configured to modify the composite sound output 70 based on the user action 52. For example, if the detected user action has resolved one of the active candidate notifications 46, that candidate notification may be removed from the filtered candidate notifications 62, and the sound rendering module 60 may be configured to modify the composite sound output 70 to remove the associated component sound 48 of that removed candidate notification.

Additionally, as candidate notifications are deactivated/removed from the priority list 54 based on the detected user actions 52, other lower priority candidate notifications may be upleveled, and may potentially no longer be filtered out of the filtered candidate notifications 62. Accordingly, the sound rendering module 60 may be configured to modify the composite sound output 70 to include the associated component sounds 48 of the candidate notifications 46 that have been added to the list of filtered candidate notifications 62.

As another example, the sound rendering module 60 may be configured to modify the associated component sound 48 of a candidate notification 46 based on a change in severity of that candidate notification or a change in completion of a multi-step user action. For example, the sound rendering module 60 may increase or decrease the volume of a particular component sound 48 in response to detecting an associated user action 52, or may change the tone or component sound itself in response to the associated user action 52. It will be appreciated that the sound rendering module 60 may perform other modifications on the composite sound output not specifically described above in response to detecting an associated user action 52.

Next, the server-side composite sound program 28 may be configured to send the modified composite sound output to be played via the speaker system 66. The modified composite sound output may be played via the same processes and methods as the original composite sound output described above.

Figure 5:
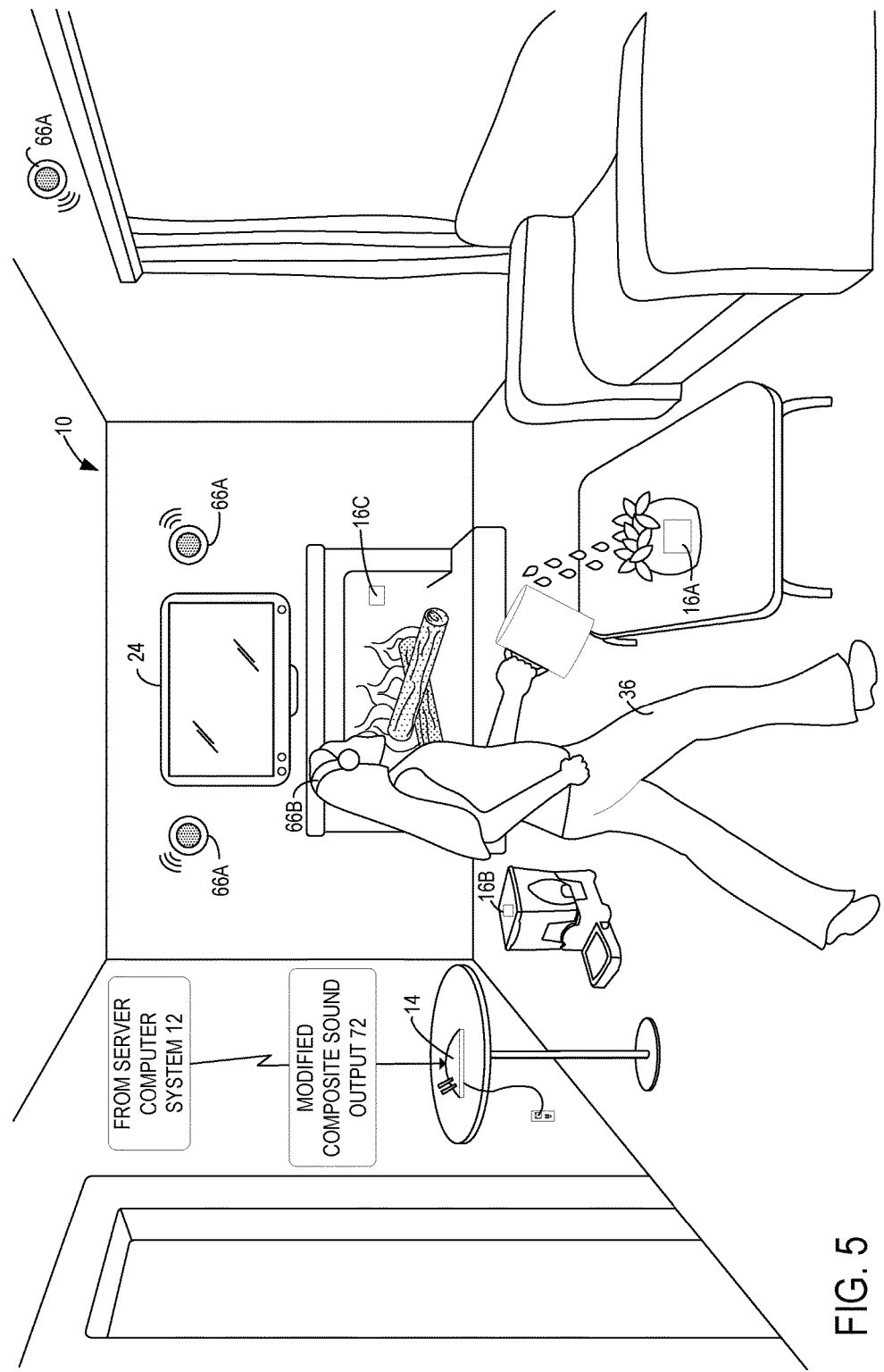
FIG. 5 shows an example user action performed in response to the composite sound output played by the speaker system of the client computer system of FIG. 1.

Turning to FIG. 5, in response to hearing the thirsty plant component sound 48A in the composite sound output 70 played via the user's near-ear speakers 66B, the user has begun performing the water plant user action 52A. By watering the plant, the moisture level of the plant as detected by the plant health sensor device of the plurality of network connected devices 16 has increased. This increase in the measured value of the plant moisture level 18A is sent to the server computer system 12 in the stream of data 22. In this example, after the notification module 50 detects that the plant moisture level 18A has increased and is above the trigger condition 44A, the notification module 50 determines that the water plant user action 52A has been performed by the user 36, and resolves the plant moisture candidate notification 46A. In another example, a microphone of the user computer device 24 and/or the near-ear speakers 66B detects the sound of the user watering the plant. The detected sound is sent to the server computer system 12, which is configured to perform sound analysis on the detected sound. Based on recognizing a water pouring sound of the detected sound, the notification module 50 determines that the water plant user action 52A has been performed by the user 36, and resolves the plant moisture candidate notification 46A.

After the plant moisture candidate notification 46A has been resolved in response to detecting the water plan user action 52A, the sound rendering module 60 modifies the composite sound output 70 to remove the thirsty plant component sound 48A associated with that plant moisture candidate notification 46A. The modified composite sound output 72 is sent from the server computer system 12 to the client computer system 10 via the wireless network device 14, or another type of network device. The modified composite sound output is then played via the user's near-ear speakers 66B, alerting the user that they have completed watering the plant.

In this manner, substantial amounts of data gathered by the plurality of network connected devices 16 may be gathered and translated into sounds that may efficiently convey the state of the plurality of network connected devices 16 to the user. By listening to the composite sound output 70, the user 36 may quickly grasp important insights in the data gathered by the plurality of network connected devices 16, and perform suitable actions to address those insights.

Figure 6:
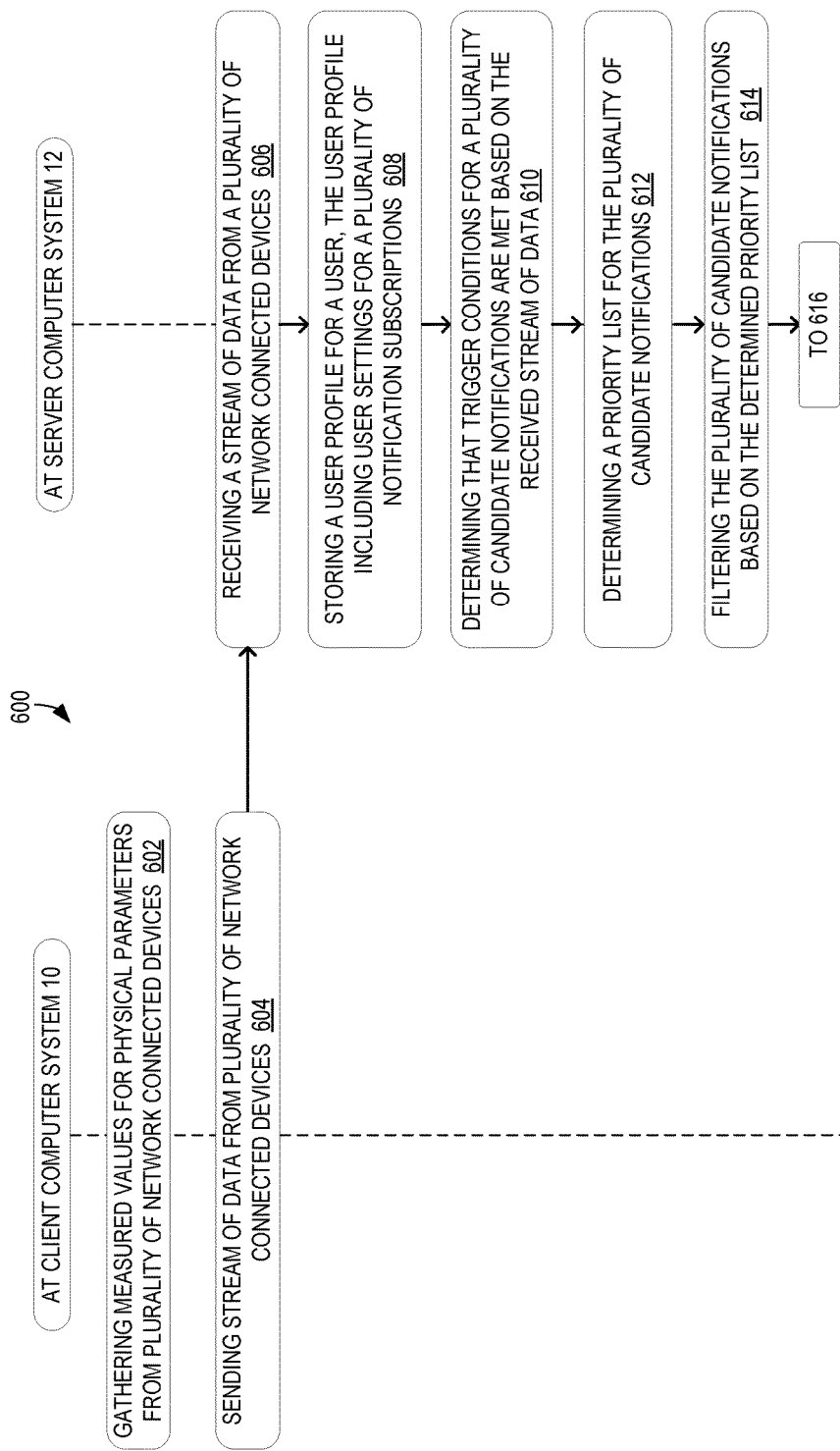
FIG. 6 shows a flowchart illustrating a method for generating a composite sound output for network connected devices implemented by the server computer system of FIG. 2.
Figure 7:
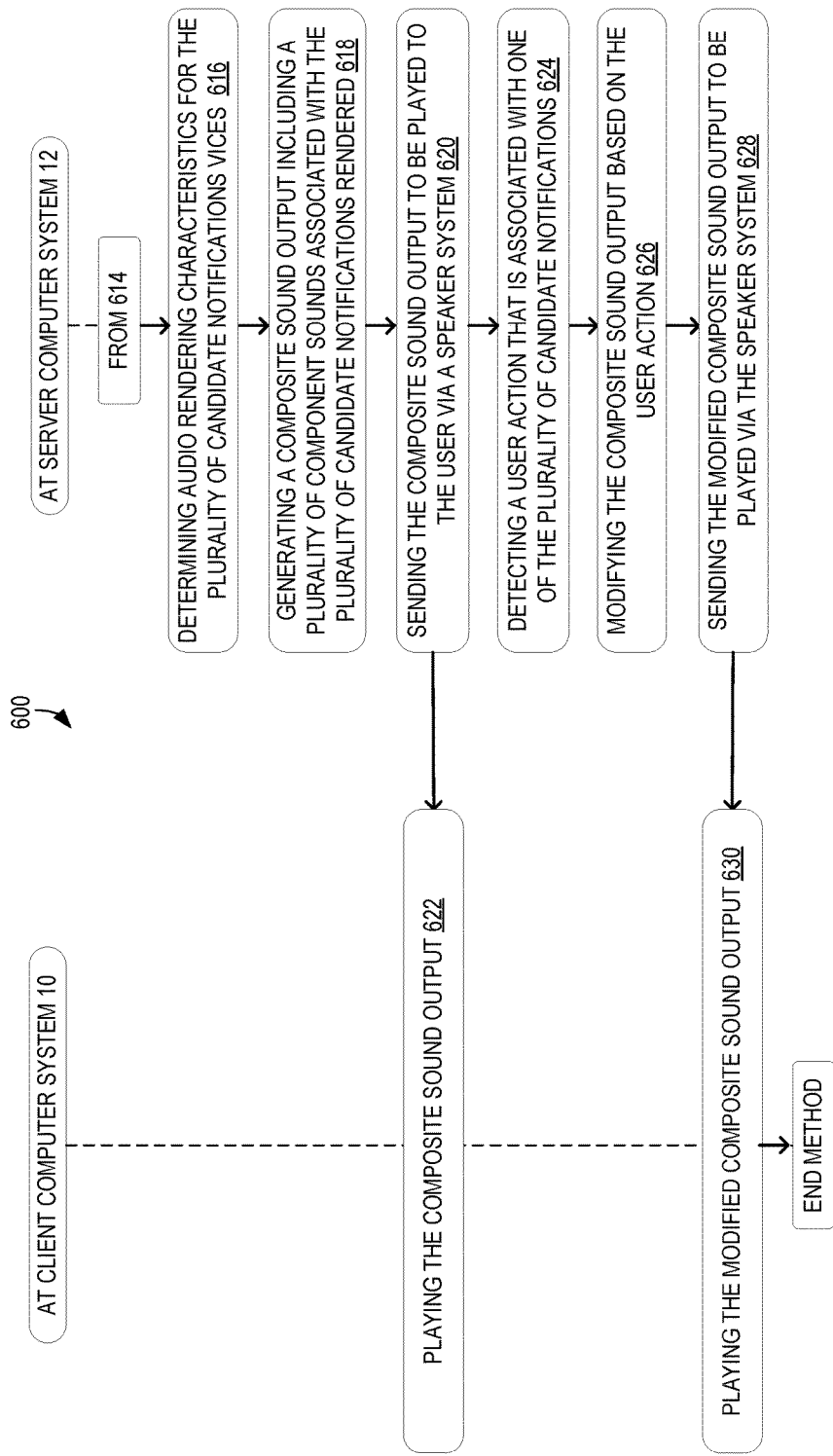
FIG. 7 shows a flowchart that continues the method of FIG. 6.

FIG. 6 is a flow chart of a method 600 implemented at a computer system including one or more processors. Method 600 may be executed using the systems described above or utilizing other suitable hardware and software elements.

At 602, the method 600 may include, at a client computer system, gathering measured values for physical parameters from a plurality of network connected devices. In one example, each network connected device 16 may include a processor or another type of hardware-logic component such as, for example, field-programmable gate arrays (FPGAs), program- and application-specific integrated circuits (PA-SIC/ASICs), program- and application-specific standard products (PSSP/ASSPs), system-on-a-chip (SOC), complex programmable logic devices (CPLDs), etc. The processor of each network connected device 16 may be configured to detect and measure a physical parameter 18 via an appropriate sensor device of the network connected device 16.

At 604, the method 600 may include sending a stream of data from the plurality of network connected devices to a server computer system. At 606, the method 600 may include receiving the stream of data from the plurality of network connected devices configured to measure physical parameters, each network connected device having an associated location. The associated location may be a latitude and longitude or Global Positioning System (GPS) location. In another example, the associated location 20 may be defined by its general location, such as in the living room, on the patio, in the backyard, in the office, etc.

At 608, the method 600 may include storing a user profile for a user, the user profile including user settings for a plurality of notification subscriptions associated with physical parameters measured by the plurality of network connected devices. Each notification subscription includes programming logic for a trigger condition for a candidate notification based on measured physical parameters and an associated component sound for the candidate notification. The user may adjust the user settings to control the data being uploaded from the client computer system 10 to the server computer system 12. For example, the user may adjust user settings 38 for each network connected device 16 to select whether measured values for the physical parameter 18 for that network connected device 16 should be uploaded to the server computer system 12, a granularity of the measured values for the physical parameter 18, and other device settings 40. The user may also adjust the device settings 40 to specify an associated location for each of the plurality of network connected devices 16, such as, for example, at the office, at home, in the living room, in the backyard, etc.

At 610, the method 600 may include determining that trigger conditions for a plurality of candidate notifications are met based on the received stream of data. In one example, the trigger condition may be a threshold value for the physical parameter being measured by the network connected device 16 associated with the candidate notification. If the measured value of the physical parameter in the stream of data meets that threshold value, then the candidate notification may be triggered and generated.

At 612, the method 600 may include determining a priority list for the plurality of candidate notifications. In one example, priority levels of candidate notifications in the priority list are determined based the detected location of the user relative to the associated locations of the plurality of network connected devices.

At 614, the method 600 may include filtering the plurality of candidate notifications based on the determined priority list by suppressing candidate notifications below a threshold priority level in the priority list. The threshold priority level may be set to prevent to many sounds from being simultaneously played to the user. For example, the threshold priority level may be set such that the top predetermined number (e.g., three, five, seven, etc.) of candidate notifications 46 are sent to the sound rendering module 60 for rendering into a composite output sound 62, while the other candidate notifications 46 are temporarily suppressed. As another example, the threshold priority level may be set such that only candidate notifications 46 with a high priority are sent to the sound rendering module 60, while all candidate notifications 46 with a low priority are temporarily suppressed. The threshold priority level may be set to a default value that is adjustable by the user via the user settings 38.

At 616, the method 600 may include determining audio rendering characteristics for the plurality of candidate notifications based on a detected location of the user relative to the associated locations of the plurality of network connected devices. In one example, the speaker system includes a near-ear speaker worn by the user and configured to output spatial audio. In one example, the near-ear speakers 66B may take the form of headphones worn by the user. As another example, the near-ear speakers 66B may take the form of earbuds or another type of hearable device that are communicatively coupled to a client computer device 24, which, for example, may take the form of a wrist-mounted or head-mounted computer device. The near-ear speakers 66B and/or the client computer device 24 may be configured to track a position and orientation of the user's head, and play spatial audio based on the tracked position and orientation of the user. In this example, the determined audio rendering characteristics may include a spatial audio rendering characteristic configured to localize each component sound being played by the near-ear speaker to the associated locations of the plurality of network connected devices relative to the detected location of the user.

In another example, the speaker system includes one or more speaker devices located proximate to the plurality of network connected devices. In this example, the determined audio rendering characteristics include a device specific audio rendering characteristic configured to specify a speaker device from a plurality of speaker devices of the speaker system for each component sound. In one example, the stream of data 22 may further include device specification data 30 for each of the plurality of network connected devices 16. The device specification data 30 may include data regarding device capabilities, device requirements, device APIs, another other suitable device specification data 30. The device specification data 30 may also include the associated location 20 for each of the plurality of network connected devices 16. In this manner, the server-side composite sound program 28 may be made aware of each network connected device 16 being employed by the user, the capabilities of those network connected devices 16, and the locations of those network connected devices 16.

At 618, the method 600 may include generating a composite sound output including a plurality of component sounds associated with the plurality of candidate notifications rendered based on the determined audio rendering characteristics. In one example, the composite sound output 70 may render only the component sounds 48 associated with the filtered candidate notifications 62, and suppress component sounds 48 from the other candidate notifications 62 that were filtered out via the priority list 54. In another example, the composite sound output 70 may render each of the component sounds 48 associated with the plurality of candidate notifications 46. In this example, the sound rendering module 60 may be further configured to render the component sounds 48 such that component sound 48 associated with candidate notifications 46 having a lower priority level in the priority list 54 are deemphasized compared to component sounds 48 associated with candidate notifications 46 having a higher priority.

In one example, the associated component sound for each candidate notification is configured to indicate the user action associated with that candidate notification to the user. For example, the associated component sound 48 may be selected to convey what kind of action the user should take to resolve the notification.

At 620, the method 600 may include sending the composite sound output to be played to the user via a speaker system. At 622, the method 600 may include, at the client computer system, playing the composite sound output via the speaker system. In one example, the composite sound output is played via near-ear speaker. In another example, the composite sound output is player via one or more speaker devices of the speaker system.

At 624, the method 600 includes detecting a user action that is associated with one of the plurality of candidate notifications. The user action may be detected based on a detected change in the stream of data 22. In another example, the user computer device 24 of the user computer system 10 may include a microphone that is configured to detect sounds near the plurality of network connected devices 16. The user computer device 24 and/or the server computer system 12 may be configured to perform sound analysis on the detected sounds, and detect recognizable sounds associated with the active candidate notifications 46. For example, the detected sounds may be analyzed to detect a water pouring sounds to determine whether the user is performing the water plant user actions 52A. In this example, the user may adjust privacy settings for the user settings 38 to specify whether sound data should be detects and/or uploaded to the server computer system 12.

At 626, the method 600 may include modifying the composite sound output based on the user action. For example, if the detected user action has resolved one of the active candidate notifications 46, that candidate notification may be removed from the filtered candidate notifications 62, and the sound rendering module 60 may be configured to modify the composite sound output 70 to remove the associated component sound 48 of that removed candidate notification.

At 628, the method 600 may include sending the modified composite sound output to be played via the speaker system. At 630, the method 600 may include playing the modified composite sound output via the speaker system.

Examples for detecting a health condition of plant, a food level of a pet feeder, and a fire state of a fireplace, and providing the user with audio notifications for those scenarios are discussed in detail above. However, it will be appreciated that the same methods and processes described herein are also applicable to many other scenarios. As a few non-limiting examples, a garage door sensor may detect whether a user left their garage door open after they have left the house. A sensor integrated into a mailbox may detect that the user has received mail. A fridge door sensor may detect whether the fridge door has been left ajar too long. Various integrated sensors may detect whether a coffee maker, television set, or other appliance has been left on for an extended period of time. A battery sensor in an electric vehicle of a user may detect whether the electric vehicle is currently charging. A battery sensor in the user's mobile phone, laptop, tablet, or other mobile computing device may detect whether the device has been plugged in for charging before the user goes to bed. A light sensor may detect whether lights in an unoccupied room have been turned off. Temperature sensors in the user's house may detect changing temperature conditions in various locations in the house so that the user can preemptively change heather and air conditioning settings. A position sensor in the collar of a household pet may detect whether the pet has escaped or has been left outside too long. Each of these scenarios may be detected by a corresponding network connected device, and trigger a notification that may be composited into the sound output played to the user. In this manner, the user may be efficiently notified of a plethora of potential areas of concern throughout their surrounding environment.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
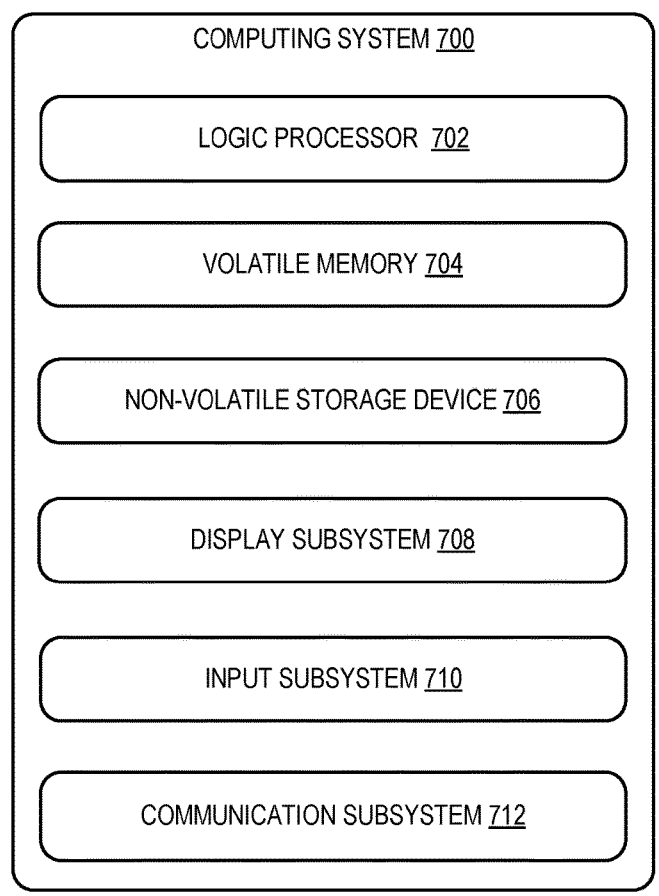
FIG. 8 is a schematic view of an example computing environment in which the client computer system of FIG. 1 and server computer system of FIG. 2 may be enacted.

FIG. 8 schematically shows a non-limiting embodiment of a computing system 700 that can enact one or more of the methods and processes described above. Computing system 700 is shown in simplified form. Computing system 700 may embody the client computer system 10 and server computer system 12 described above and illustrated in FIG. 1. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 8.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 704 may be transformed—e.g., to hold different data.

Non-volatile storage device 706 may include physical devices that are removable and/or built-in. Non-volatile storage device 704 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The following paragraphs provide additional support for the claims of the subject application. One aspect provides a computer system comprising one or more processors configured to receive a stream of data from a plurality of network connected devices configured to measure physical parameters, each network connected device having an associated location. In this aspect, the one or more processors are configured to store a user profile for a user, the user profile including user settings for a plurality of notification subscriptions associated with physical parameters measured by the plurality of network connected devices, each notification subscription including programming logic for a trigger condition for a candidate notification based on measured physical parameters and an associated component sound for the candidate notification. In this aspect, the one or more processors are configured to determine that trigger conditions for a plurality of candidate notifications are met based on the received stream of data, determine audio rendering characteristics for the plurality of candidate notifications based on a detected location of the user relative to the associated locations of the plurality of network connected devices, generate a composite sound output including a plurality of component sounds associated with the plurality of candidate notifications rendered based on the determined audio rendering characteristics, and send the composite sound output to be played to the user via a speaker system. In this aspect, additionally or alternatively, the speaker system may include a near-ear speaker worn by the user and configured to output spatial audio. In this aspect, additionally or alternatively, the determined audio rendering characteristics may include a spatial audio rendering characteristic configured to localize each component sound being played by the near-ear speaker to the associated locations of the plurality of network connected devices relative to the detected location of the user. In this aspect, additionally or alternatively, the speaker system may include one or more speaker devices located proximate to the plurality of network connected devices. In this aspect, additionally or alternatively, the determined audio rendering characteristics may include a device specific audio rendering characteristic configured to specify a speaker device from a plurality of speaker devices of the speaker system for each component sound. In this aspect, additionally or alternatively, the one or more processors may be further configured to detect a user action that is associated with one of the plurality of candidate notifications, modify the composite sound output based on the user action, and send the modified composite sound output to be played via the speaker system. In this aspect, additionally or alternatively, the associated component sound for each candidate notification may be configured to indicate the user action associated with that candidate notification to the user. In this aspect, additionally or alternatively, the one or more processors may be further configured to determine a priority list for the plurality of candidate notifications, and filter the plurality of candidate notifications based on the determined priority list by suppressing candidate notifications below a threshold priority level in the priority list. In this aspect, additionally or alternatively, priority levels of candidate notifications in the priority list may be determined based the detected location of the user relative to the associated locations of the plurality of network connected devices. In this aspect, additionally or alternatively, priority levels of candidate notifications in the priority list may be determined based on a detected mode of the user including a work mode and a personal mode.

Another aspect provides a method comprising, at a computer system including one or more processors, receiving a stream of data from a plurality of network connected devices configured to measure physical parameters, each network connected device having an associated location. In this aspect, the method further comprises storing a user profile for a user, the user profile including user settings for a plurality of notification subscriptions associated with physical parameters measured by the plurality of network connected devices, each notification subscription including programming logic for a trigger condition for a candidate notification based on measured physical parameters and an associated component sound for the candidate notification. In this aspect, the method further comprises determining that trigger conditions for a plurality of candidate notifications are met based on the received stream of data, determining audio rendering characteristics for the plurality of candidate notifications based on a detected location of the user relative to the associated locations of the plurality of network connected devices, generating a composite sound output including a plurality of component sounds associated with the plurality of candidate notifications rendered based on the determined audio rendering characteristics, and sending the composite sound output to be played to the user via a speaker system. In this aspect, additionally or alternatively, the speaker system may include a near-ear speaker worn by the user and configured to output spatial audio. In this aspect, additionally or alternatively, the determined audio rendering characteristics may include a spatial audio rendering characteristic configured to localize each component sound being played by the near-ear speaker to the associated locations of the plurality of network connected devices relative to the detected location of the user. In this aspect, additionally or alternatively, the speaker system may include one or more speaker devices located proximate to the plurality of network connected devices. In this aspect, additionally or alternatively, the determined audio rendering characteristics may include a device specific audio rendering characteristic configured to specify a speaker device from a plurality of speaker devices of the speaker system for each component sound. In this aspect, additionally or alternatively, the method may further comprise detecting a user action that is associated with one of the plurality of candidate notifications, modifying the composite sound output based on the user action, and sending the modified composite sound output to be played via the speaker system. In this aspect, additionally or alternatively, the associated component sound for each candidate notification may be configured to indicate the user action associated with that candidate notification to the user. In this aspect, additionally or alternatively, the method may further comprise determining a priority list for the plurality of candidate notifications, and filtering the plurality of candidate notifications based on the determined priority list by suppressing candidate notifications below a threshold priority level in the priority list. In this aspect, additionally or alternatively, priority levels of candidate notifications in the priority list may be determined based the detected location of the user relative to the associated locations of the plurality of network connected devices.

Another aspect provides a computer system comprising one or more processors configured to receive a stream of data from a plurality of network connected devices configured to measure physical parameters, each network connected device having an associated location. In this aspect, the one or more processors are configured to process the stream of data using a plurality of notification subscriptions associated with physical parameters measured by the plurality of network connected devices, each notification subscription including programming logic for a trigger condition for a candidate notification based on measured physical parameters and an associated component sound for the candidate notification. In this aspect, the one or more processors are configured to determine that trigger conditions for a plurality of candidate notifications are met based on the received stream of data, determine a priority list for the plurality of candidate notifications, filter the plurality of candidate notifications based on the determined priority list by suppressing candidate notifications below a threshold priority level in the priority list, generate a composite sound output including a plurality of component sounds associated with the filtered plurality of candidate notifications, and send the composite sound output to be played to the user via a speaker system.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:
1. A computer system comprising:
one or more processors configured to:

receive a stream of data from a plurality of network connected devices configured to measure physical parameters, each network connected device having an associated location;

store a user profile for a user, the user profile including user settings for a plurality of notification subscriptions associated with physical parameters measured by the plurality of network connected devices, each notification subscription including programming logic for a trigger condition for a candidate notification based on measured physical parameters and an associated component sound for the candidate notification;

determine that trigger conditions for a plurality of candidate notifications are met based on the received stream of data;

determine audio rendering characteristics for the plurality of candidate notifications based on a detected location of the user relative to the associated locations of the plurality of network connected devices;

generate a composite sound output including a plurality of component sounds associated with the plurality of candidate notifications rendered based on the determined audio rendering characteristics; and send the composite sound output to be played to the user via a speaker system.

2. The computer system of claim 1, wherein the speaker system includes a near-ear speaker worn by the user and configured to output spatial audio.

3. The computer system of claim 2, wherein the determined audio rendering characteristics include a spatial audio rendering characteristic configured to localize each component sound being played by the near-ear speaker to the associated locations of the plurality of network connected devices relative to the detected location of the user.

4. The computer system of claim 1, wherein the speaker system includes one or more speaker devices located proximate to the plurality of network connected devices.

5. The computer system of claim 4, wherein the determined audio rendering characteristics include a device specific audio rendering characteristic configured to specify a speaker device from a plurality of speaker devices of the speaker system for each component sound.

6. The computer system of claim 1, wherein the one or more processors are further configured to:
detect a user action that is associated with one of the plurality of candidate notifications;
modify the composite sound output based on the user action; and
send the modified composite sound output to be played via the speaker system.

7. The computer system of claim 6, wherein the associated component sound for each candidate notification is configured to indicate the user action associated with that candidate notification to the user.

8. The computer system of claim 1, wherein the one or more processors are further configured to:
determine a priority list for the plurality of candidate notifications; and
filter the plurality of candidate notifications based on the determined priority list by suppressing candidate notifications below a threshold priority level in the priority list.

9. The computer system of claim 8, wherein priority levels of candidate notifications in the priority list are determined based the detected location of the user relative to the associated locations of the plurality of network connected devices.

10. The computer system of claim 8, wherein priority levels of candidate notifications in the priority list are determined based on a detected mode of the user including a work mode and a personal mode.

11. A method comprising:
at a computer system including one or more processors:
receiving a stream of data from a plurality of network connected devices configured to measure physical parameters, each network connected device having an associated location;
storing a user profile for a user, the user profile including user settings for a plurality of notification subscriptions associated with physical parameters measured by the plurality of network connected devices, each notification subscription including programming logic for a trigger condition for a candidate notification based on measured physical parameters and an associated component sound for the candidate notification;
determining that trigger conditions for a plurality of candidate notifications are met based on the received stream of data;
determining audio rendering characteristics for the plurality of candidate notifications based on a detected location of the user relative to the associated locations of the plurality of network connected devices;
generating a composite sound output including a plurality of component sounds associated with the plurality of candidate notifications rendered based on the determined audio rendering characteristics; and
sending the composite sound output to be played to the user via a speaker system.

12. The method of claim 11, wherein the speaker system includes a near-ear speaker worn by the user and configured to output spatial audio.

13. The method of claim 12, wherein the determined audio rendering characteristics include a spatial audio rendering characteristic configured to localize each component sound being played by the near-ear speaker to the associated locations of the plurality of network connected devices relative to the detected location of the user.

14. The method of claim 11, wherein the speaker system includes one or more speaker devices located proximate to the plurality of network connected devices.

15. The method of claim 14, wherein the determined audio rendering characteristics include a device specific audio rendering characteristic configured to specify a speaker device from a plurality of speaker devices of the speaker system for each component sound.

16. The method of claim 11, further comprising:
detecting a user action that is associated with one of the plurality of candidate notifications;
modifying the composite sound output based on the user action; and
sending the modified composite sound output to be played via the speaker system.

17. The method of claim 16, wherein the associated component sound for each candidate notification is configured to indicate the user action associated with that candidate notification to the user.

18. The method of claim 11, further comprising:
determining a priority list for the plurality of candidate notifications; and filtering the plurality of candidate notifications based on the determined priority list by suppressing candidate notifications below a threshold priority level in the priority list.

19. The method of claim 18, wherein priority levels of candidate notifications in the priority list are determined based the detected location of the user relative to the associated locations of the plurality of network connected devices.

20. A computer system comprising:
one or more processors configured to:
- receive a stream of data from a plurality of network connected devices configured to measure physical parameters, each network connected device having an associated location;
- process the stream of data using a plurality of notification subscriptions associated with physical parameters measured by the plurality of network connected devices, each notification subscription including programming logic for a trigger condition for a candidate notification based on measured physical parameters and an associated component sound for the candidate notification;
- determine that trigger conditions for a plurality of candidate notifications are met based on the received stream of data;
- determine a priority list for the plurality of candidate notifications;
- filter the plurality of candidate notifications based on the determined priority list by suppressing candidate notifications below a threshold priority level in the priority list;
- generate a composite sound output including a plurality of component sounds associated with the filtered plurality of candidate notifications; and
- send the composite sound output to be played to the user via a speaker system.

* * * * *